Figure 1:
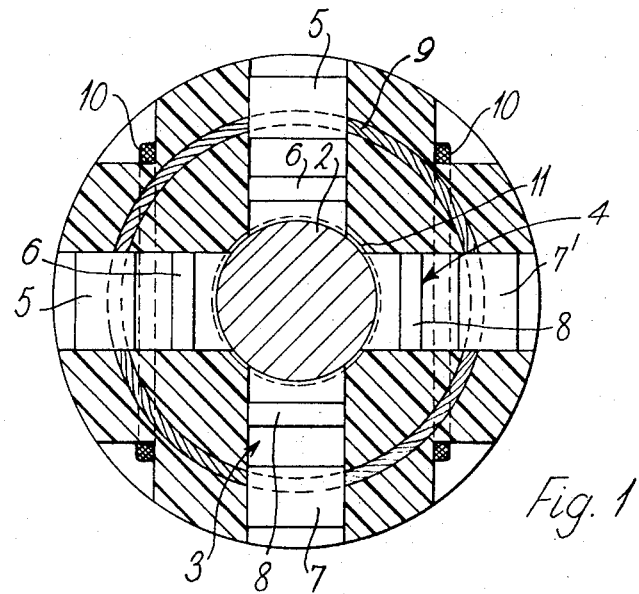

United States Patent [19]
Usher

[11] 3,839,670
[45] Oct. 1, 1974

[54] SELF-OSCILLATING VECTOR MAGNETOMETER

[75] Inventor: Michael John Usher, Reading, England

[73] Assignee: National Research Development Corporation, London, England

[22] Filed: Sept. 27, 1972

[21] Appl. No.: 292,788

[30] Foreign Application Priority Data
Oct. 4, 1971  Great Britain.................... 46104/71

[52] U.S. Cl.............................................. 324/.5 R
[51] Int. Cl........................................... G01r 33/08
[58] Field of Search............................ 324/.5 E, .5 F

[56] References Cited
UNITED STATES PATENTS
3,256,500  6/1966  Arnold............................... 324/.5 F
3,500,176  3/1970  Kastler............................. 324/.5 F Primary Examiner—Michael J. Lynch
Attorney, Agent, or Firm—Cushman, Darby & Cushman

[57] ABSTRACT

A magnetometer utilises two perpendicular beams of circularly polarised light passed through a single gas cell. One beam, in the direction of total magnetic field, optically pumps the atoms in the cell into a particular Zeeman sub-level of the ground state, and a photocell monitoring the other beam is used to produce self oscillation at the Larmor frequency, the value of which is a measure of field magnitude. A photo cell monitoring the pumping beam produces signals in phase, antiphase or quadrature with that on the monitoring beam, and these signals provide vector information of field components arising perpendicular to the fixed direction of the pumping beam.

1 Claim, 2 Drawing Figures

PATENTED OCT 1 1974　　　　　　　　　3,839,670

SELF-OSCILLATING VECTOR MAGNETOMETER

The present invention concerns rubidium magnetometers. Such instruments have become widely used in geophysical observatories, mineral exploration, and rocket and satellite investigations. The importance of this type of instrument arises from its high sensitivity, continuous output and fast response.

A well known type of rubidium magnetometer known as the self-oscillating magnetometer, basically comprises a rubidium lamp, filter/polariser unit, a gas cell containing rubidium and a photocell. Filtered and polarised light from the lamp optically pumps the atoms in the gas cell to a particular ground state energy level. When subjected to a magnetic field, the ground state energy level exhibits Zeeman splitting and the frequency of transition between the excited level and a neighbouring level is directly proportional to the magnitude of the magnetic field. In the self-oscillating magnetometer the sensor axis is inclined to the direction of the total field and the light reaching the photocell is intensity modulated at the transition frequency. The photocell signal is fed back to a coil surrounding the gas cell to maintain the phase-coherence of the precessing atomic momenta, and to ensure self-oscillation of the magnetometer. The output of the instrument is thus a frequency directly porportional to the strength of the magnetic field so that standard frequency counting techniques can be used in its measurement. The magnetic field/frequency relationship is determined by known atomic constants and to a first order, the frequency is independent of the orientation of the magnetometer with respect to the field direction. In fact, the signal amplitude follows a sign $2\theta$ law, where $\theta$ is the angle between the instrument axis and the total field direction F. The magnetometer thus only measures the scalar field magnitude and although scalar information is useful, vector information is often required for the interpretation of polarisation of micropulsations or of the geography of ore bodies etc. The most frequently employed method of obtaining vector information from the known rubidium magnetometer described is to enclose the instrument in bias coils and to annul unwanted field components.

Unfortunately all previous methods introduce errors into the measurement so that instead of the measurements being determined by atomic constants the accuracy depends upon the stability of the coil system geometry and bias currents.

In accordance with the present invention there is provided a magnetometer comprising means for passing a pair of beams of circularly polarised light through a gas cell containing atoms, the energy levels of which can be optically pumped to an excited state; a pair of photocells each arranged to receive one of the light beams after it has passed through the cell, and means for detecting any in-phase, antiphase and quadrature components of the output signal of one of the photocells with respect to the output signal of the other photocell caused by magnetic field components additional to and in differing directions from the total field, and means for deriving vector field information from the detected in-phase, anti-phase or quadrature components to coils surrounding the cell to annul the additional magnetic field components.

Preferably the light beams are orthogonal to one another and each light beam may be generated by a rubidium lamp radiating light through a circular polariser.

In accordance with a feature of the invention the output of one of the photocells is amplified, phase shifted and applied to a further coil surrounding the gas cell to maintain self-oscillation in the instrument.

Figure 2:
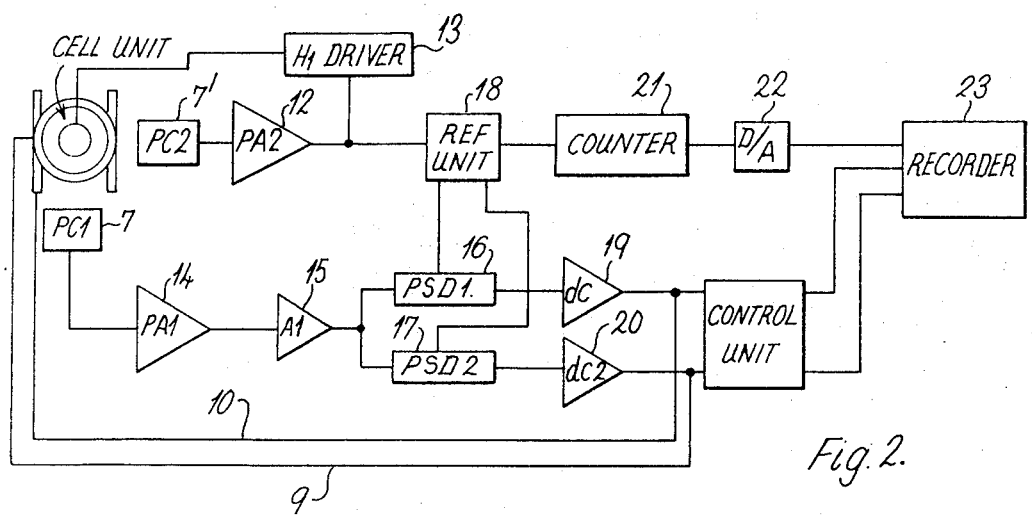

An embodiment of the present invention will now be described by way of example and with reference to the accompanying drawings in which:

FIG. 1 is a radial cross-section through a vector rubidium magnetometer constructed in accordance with the present invention; and FIG. 2 is a block diagram of part of the electronic circuitry.

The rubidium magnetometer shown in the accompanying drawings comprises a cylindrical block 1 using a gas cell 2 containing rubidium vapour. The cell 2 is located at the intersection of two sensors 3 and 4 arranged at right angles to one another and radially with respect to the block 1. The two sensors are identical and each consists of a rubidium lamp 5, a filter/polariser/lens unit 6, a photocell 7 and a lens 8 for focussing the light from the lamp 5 on to the photocell 7. The instrument further includes a Helmholtz coil 9 concentric to the cell 2, with its axis perpendicular to both those of sensors 3 and 4, a second Helmholtz coil 10 with its axis parallel to that of sensor 4 and a coil 11 closely wound around the cell 2. The purpose of these coils will be described later. When the instrument is in use the light beam from the lamp 5 of the sensor 3 is aligned along the total field direction F so that the light beam in the sensor 4 is in the east/west direction and the two sets of coils 9 and 10 have their axes respectively perpendicular to both F and the east/west direction, and in the east/west direction. As the axis of the sensor 3 lies along the total field direction F the beam of light from its lamp 5 will provide maximum pumping of the energy levels of the atoms in the cell 2 and there will be no intensity modulation of the beam. Thus, the photocell 7 associated with the sensor 3 will give a steady output. The beam of light in the sensor 4 lying on the east/west axis can then be considered as a monitoring beam, monitoring the states of the atoms in the cell 2. These will be precessing at the Lamor frequency so that the monitoring beam will be intensity modulated at the Lamor frequency. The output of the photocell 7' is thus a signal having a frequency corresponding to the Lamor frequency and this signal is amplified in a suitable amplifier 12 and taken to a driver unit 13 where it is shifted 90° in phase and applied to the coil 11 to maintain self-oscillation exactly as in a standard single beam magnetometer. If a field change now occurs along the total field F, the direction of the total field F remains unchanged. However, the Lamor frequency will change appropriately as in the case of a single beam magnetometer giving purely scalar information. However, if there is a field change in the east/west direction there will be a change in the direction of F and this will produce a signal on the photocell 7 of the sensor 3 at the Lamor frequency. The phase of this signal will be in phase or anti-phase with that on the photocell 7' depending on the polarity of the new field component. This signal is first amplified in an amplifier 14 identical to the amplifier 12 and is then further amplified in a buffer amplifier 15. The output of the amplifier 15 is taken to a pair of identical parallel phase sensitive detectors 16 and 17, the reference inputs of which are in quadrature and are provided by a double reference unit 18 connected to the output of amplifier 12. The outputs of the phase sensitive detectors 16 and 17 are respectively fed to a pair of dc operational amplifiers 19 and 20 and fed to the coils 9 and 10. In the case of the new field component in the east/west direction the in-phase or anti-phase component produced by the component is detected in phase sensitive detector 17, amplified in amplifier 20 and applied to the coil 10 to nullify the field component.

Should the new field component appear which is perpendicular both to the total field direction F and to the east/west direction, this component will produce an output signal on photocell 7 which is in quadrature with the signal from photocell 7'.

This signal is treated in a similar manner in phase sensitive detector 16, amplified by amplifier 19 and applied to coil 9 to nullify the new field component.

It can thus be seen that the instrument described has in effect three output channels containing information concerning the magnetic fields surrounding the instrument. The first channel is the output of photocell 7' containing scalar information in the form of the frequency of the signal produced by the photocell 7'. This frequency is counted in a counter 21, converted to analogue form in a digital-to-analogue converter 22 and supplied as one input to a three channel recorder 23.

The second channel is that in which the in-phase or anti-phase component of the signal on photocell 7 is detected, this signal being caused by an additional field component in the east/west direction.

The value of the dc signal from operational amplifier 20 required to annul this component gives the magnitude of the east/west component and is supplied to the second input of the three channel recorder 23.

Finally the third channel is that in which the quadrature component of the signal on photocell 7 occurs caused by an additional field component in the direction perpendicular to both the total field direction and the east/west direction and in a similar manner the output signal from amplifier 19 is applied to coil 9 to annul this particular field component, and is also supplied to the third input of the three channel recorder 23.

The three inputs to the recorder 23 are thus as follows:

1. Value of the total field F, obtained from the Lamor frequency
2. Field component in the east/west direction
3. Field component perpendicular to F and to the east/west direction Thus complete vector information is obtained from a single instrument.

The cylindrical block 1 in which the various sensors are housed may be machined from Tufnol (Registered Trade Mark).

The embodiment described thus provides complete vector information from a single compact instrument. The sensitivity is good (0.01 gamma for F, and 0.1 gamma for the other two values, in 1 second) and the stability is high on account of the closed loop arrangement. It is particularly suitable where rapid setting up is necessary as in micropulsation studies at temporary field sites.

I claim:

1. A magnetometer comprising means for passing a pair of beams of circularly polarised light through a gas cell containing atoms, the energy levels of which can be pumped to an excited state, the beams of light being orthogonal with respect to one another, first and second photocells each arranged to receive one of the light beams after it has passed through said cell, first and second amplifiers connected respectively to the outputs of said first and second photocells, first and second parallel phase sensitive detectors, a reference unit connected to the output of said first amplifier and connected to said first and second parallel phase sensitive detectors to provide reference signals in quadrature to the latter, the output of said second amplifier being connected to the inputs of said first and second phase sensitive detectors, so that said phase sensitive detectors can detect in-phase anti-phase or quadrature components in the output signals from said photocells, first and second coils surrounding said cell with their axes orthogonal to each other, first and second DC operational amplifiers having their inputs connected respectively to the outputs of said first and second phase sensitive detectors and their outputs connected respectively to said first and second coils to annul the additional magnetic field components causing said in-phase, anti-phase and quadrature components, a third coil surrounding said cell, an additional phase-shifter, the amplified output of said first photocell connected to said additional phase-shifter which is in turn connected to said third coil surrounding said cell to maintain self-oscillation.

* * * * *